United States Patent [19]

Raucci

[11] Patent Number: 4,852,124

[45] Date of Patent: Jul. 25, 1989

[54] DIGITAL PHASE-LOCKED LOOP CLOCK EXTRACTOR FOR BIPOLAR SIGNALS

[75] Inventor: Michele Raucci, Milan, Italy

[73] Assignee: Siemens Telecommunicazioni, S.p.A., Milan, Italy

[21] Appl. No.: 201,517

[22] Filed: Jun. 1, 1988

[30] Foreign Application Priority Data

Jul. 30, 1987 [IT] Italy ................. 21527 A/87

[51] Int. Cl.⁴ .................. H04L 25/48; H04L 7/02
[52] U.S. Cl. ..................................... 375/20; 375/120; 328/155
[58] Field of Search ............... 375/20, 120, 110, 118; 328/155; 331/1 A, 1 R, 25; 329/56, 109, 122

[56] References Cited

U.S. PATENT DOCUMENTS

| 4,280,099 | 7/1981 | Rattlingourd | 328/155 |
| 4,456,890 | 6/1984 | Carickhoff | 375/120 |

Primary Examiner—Robert L. Griffin
Assistant Examiner—Marianne Huseman
Attorney, Agent, or Firm—Jeffrey P. Morris

[57] ABSTRACT

A clock extractor circuit comprising a frequency divider which derives the clock signal from a signal having a frequency which is a multiple of the frequency of a received bipolar signal input. A correction logic circuit in the frequency divider compares the logic state of the frequency divider with a transition detection signal derived by sampling the bipolar signal at the multiple frequency and, on the basis of the phase error detected, commands a phase correction of the clock signal.

6 Claims, 4 Drawing Sheets

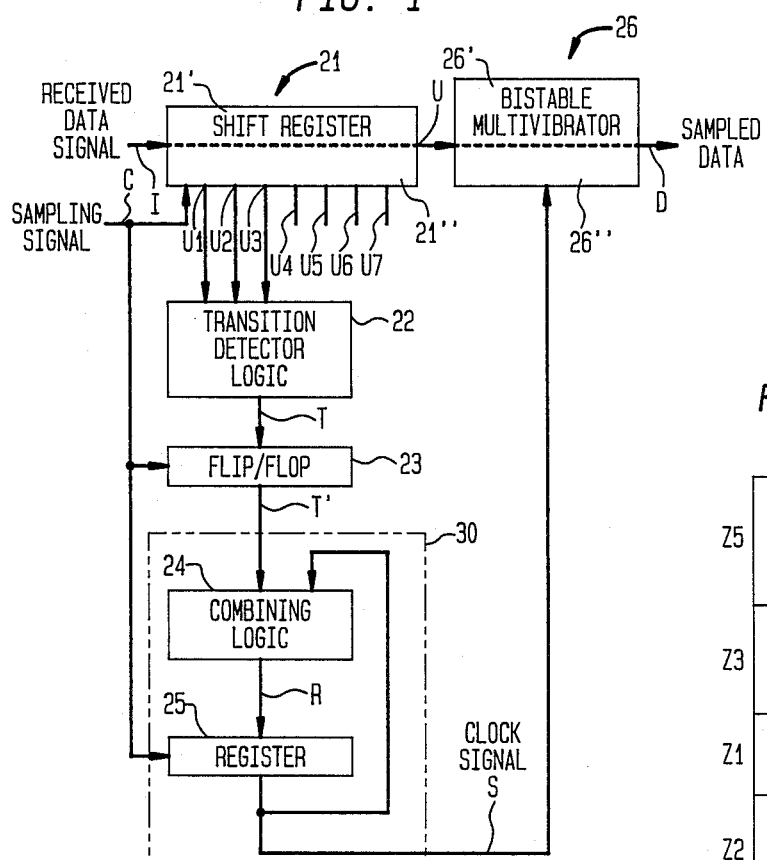
FIG. 1
FIG. 8
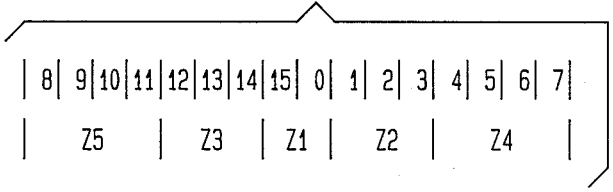
FIG. 7

DIGITAL PHASE-LOCKED LOOP CLOCK EXTRACTOR FOR BIPOLAR SIGNALS

BACKGROUND OF THE INVENTION

1. Field of the Invention.

The present invention relates to a digital phase-locked loop clock extractor for bipolar signals.

More particularly, the clock extractor in accordance with the present invention comprises a circuit designed to allow taking from a PCM (pulse code modulation) input signal a clock signal phase locked to the input signal to allow sampling of the input signal latter with the clock signal without loss of information even in the presence of jitter (phase distortion) and frequency tolerance.

The function of clock signal extraction from a received data signal constituting the input signal has heretofore been done principally in the analog mode and recently also in the digital mode both with discrete and integrated circuit components.

The known prior art analog circuitry uses a tuned circuit or a frequency-controlled oscillator. Maintenance of an appropriate phase between the input signal and the clock signal takes place continuously and the clock signal extracted does not display phase jumps. These prior art circuits have been developed by some manufacturers of integrated circuits and can be implemented as well with discrete components. They display, however, criticality of operation, the need for calibration and generally poor reliability.

Clock extractors implemented digitally do not suffer from the aforementioned drawbacks. In order to meet the CCITT (International Telegraph and Telephone Consulative Committee) recommendations relative to jitter of the input data signal such known circuits produce a single considerable phase jump of the extracted clock. Such a phase jump appears even with low jitter at the input to compensate for the inevitable frequency differences between the line clock and the local clock.

In view of the aforementioned state of the art, the object of the present invention is to provide a clock signal extractor of the digital type which enables having in normal operating conditions a low phase jump capable of compensating for the frequency difference between the local clock and the line clock in the presence of low input jitter and at the same time in the presence of high jitter, permits sampling of the data signal received without loss of information, while producing a higher instantaneous phase correction of the generated clock signal.

SUMMARY OF THE INVENTION

In accordance with the present invention, a digital clock extractor for bipolar signals is provided which comprises at least one shift register supplied with a bipolar signal input received and sampled with a sampling signal having a frequency which is a multiple of the frequency of said received signal, a transition detector logic circuit associated with a combination of outputs of said shift register to generate a transition detection signal of the signal received upon reaching a certain sequence of logic states at the register outputs, a frequency divider consisting of a counter fed with said multiple-frequency sampling signal and programmed to provide at the output a clock signal extracted at the same frequency as the received signal, with the divider having a correction logic circuit which compares the transition detection signal with the instantaneous logic stage at the outputs of the counter to evaluate received signal, and to command a phase correction of the clock signal, the magnitude of which is a progressively increasing function of the error signal.

With the correction effected, the leading edge of the extracted clock signal is repositioned to cause it to fall within the pulse of the bipolar signal received even in the presence of momentary variations of phase due to the applied jitter.

At the same time, the progressively increasing function, which is substantially logarithmic, provided between the phase error and the phase correction, provides a very small phase error, i.e. with the counter essentially in phase with the transition detection signal, no correction is effected. This avoids continuous phase jumps of the clock signal phase locked to the input signal.

The correction effected meets the above mentioned CCITT recommendations without loss of information and also, under normal conditions, with low jitter, provides an extremely small phase jump.

An example of a preferred embodiment of the clock signal extractor in accordance with the present invention is described in detail with reference to the accompanying drawings wherein:

BRIEF DESCRIPTION OF THE DRAWINGS

FIG. 1 shows a block diagram of the clock signal extractor in accordance with the present invention;

FIGS. 7 and 8 show tables representative of the mode of operation of the correction unit of the frequency divider on the basis of the phase error detected.

DESCRIPTION OF THE PREFERRED EMBODIMENT

The digital clock extractor illustrated in FIG. 1 comprises a shift register 21 which receives at its input a 2.048 Mbit/s bipolar PCM (Pulse Code Modulation) signal sampled with a sampling signal C at 32.768 MHz, i.e. at a frequency sixteen times that of the input signal or received data signal I.

Figure 2:
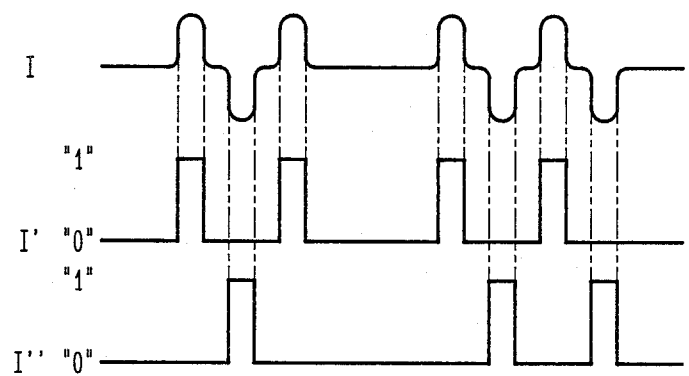
FIG. 2 shows some representative diagrams of the shape in time of a bipolar input signal and of two separate signals with all positive pulses which can be taken from the bipolar signal.

A bipolar PCM signal is known to consist of a succession of negative and positive return-to-zero pulses. Appropriate means are therefore provided but not shown in the figure and placed upstream of the register 21 to subdivide the bipolar signal I on two lines to bring the positive pulses I' onto one of the lines and the negative pulses I" onto the other line with the logic convention that level '0' indicated the absence of signal and level "1" indicates the presence of the pulse. The shape of the two signals thus obtained is shown by way of example in FIG. 2.

The shift register 21 is comprised of a pair of registers 21'-21" in parallel, each of which registers receives the signal (I', I") present on one of the two lines.

The shift register 21 has seven pairs of parallel outputs U1-U7 corresponding to the same number of successive stages of the registers 21' and 21" and of another pair of serial outputs U, one for each register.

Figure 3:
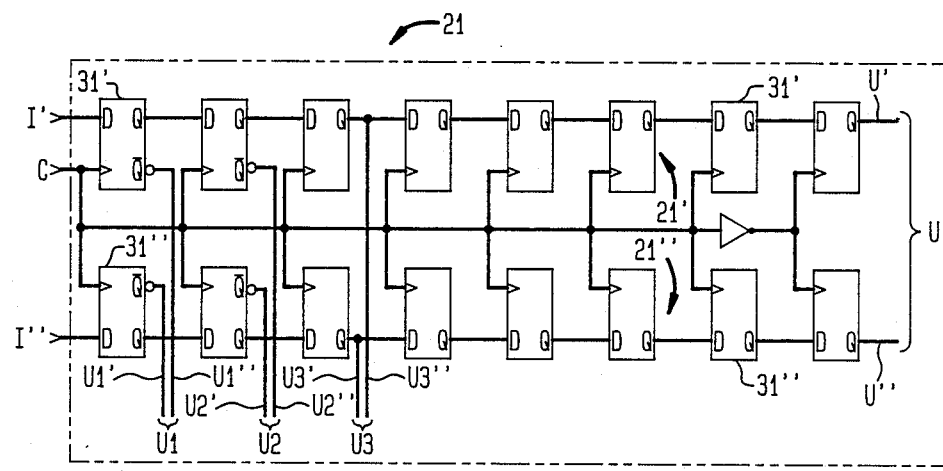
FIG. 3 shows a more detailed diagram of a shift register which receives the bipolar signal at the input of the clock signal extractor of FIG. 1.

More particularly, as shown in FIG. 3, each register 21', 22" comprises a succession of bistable multivibrators 31', 31" which receives at its input a respective signal I', I" and supplies a respective serial output U', U" corresponding to the output of FIG. 1 and respective parallel outputs U1'-U7', U1"-U7" (U1'-U3' and the U1"-U3" are illustrated in FIG. 3) corresponding to the outputs U1-U7 of FIG. 1.

Due to the effect of the two registers, the input data signal is delayed by 7.5 periods of the sampling signal C, with the delay being selected on the basis of the pulse duration of the data signal I received, as an example equal to 244 ns, which is characteristic of the return-to-zero 2.048 Mbit/s signals.

As will be explained in greater detail in the following description, this has the purpose of permitting the extracted clock signal to sample the data at the output U of the register 21 during the pulse of said data, preferably in the central part of the pulse.

Figure 4:
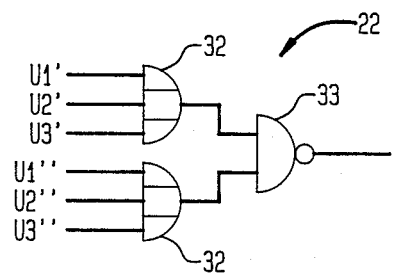
FIG. 4 shows a more detailed diagram of a transition detector associated with the shift register.

The first three parallel outputs U1, U2 and U3 of the register 21 (i.e. U1', U2', U3'; U1", U2", U3" of the register 21', 21") are combined in a transition detector logic 22 which through the combination of their logic states obtained through logic gates OR 32 and NAND 33 shown in FIG. 4 detects the presence or absence of a transition of the data received from 0 to 1 on either one of the two outputs.

More particularly, the detector 22 detects the presence of the transition 0-1, which indicates the instant of beginning of the data received by decodification of the 011 sequence at the outputs U3, U2, U1 of the register 21' or 21". This allows filtering of any spikes present in the input signal I, which with the sequence 010 do not produce recognition of the beginning of the data. The output of the detector 22 then consists of the logic OR function, carried out by NAND gate 33, of the two decoding logic circuits related to the registers 21' and 21".

Through a bistable multivibrator (flip-flop) 23 activated by the sampling signal C the transition detection signal T generated by the detector 22, is applied, as a delayed transition detector signal T', to an input of a combining logic 24 which fulfills the functions of phase correction and frequency division of a programmable frequency divider 30. The output of the combining logic 24 is applied to the input of a register 25 clocked with the sampling signal C, said register constituting the sequential part of the divider 30. All the outputs of the register 25 are brought back to other inputs of the combining logic 24 while the most significant output of the register comprises the extracted clock signal S having the same frequency as the received signal I. The clock signal S is used, for example, for sampling of the data signal U (U'+U") present at the output of the register 21 through a bistable multivibrator 26 (in reality a multivibrator 26', 26" for every register 21', 21") at the output of which the sampled data D is made available.

Figure 5:
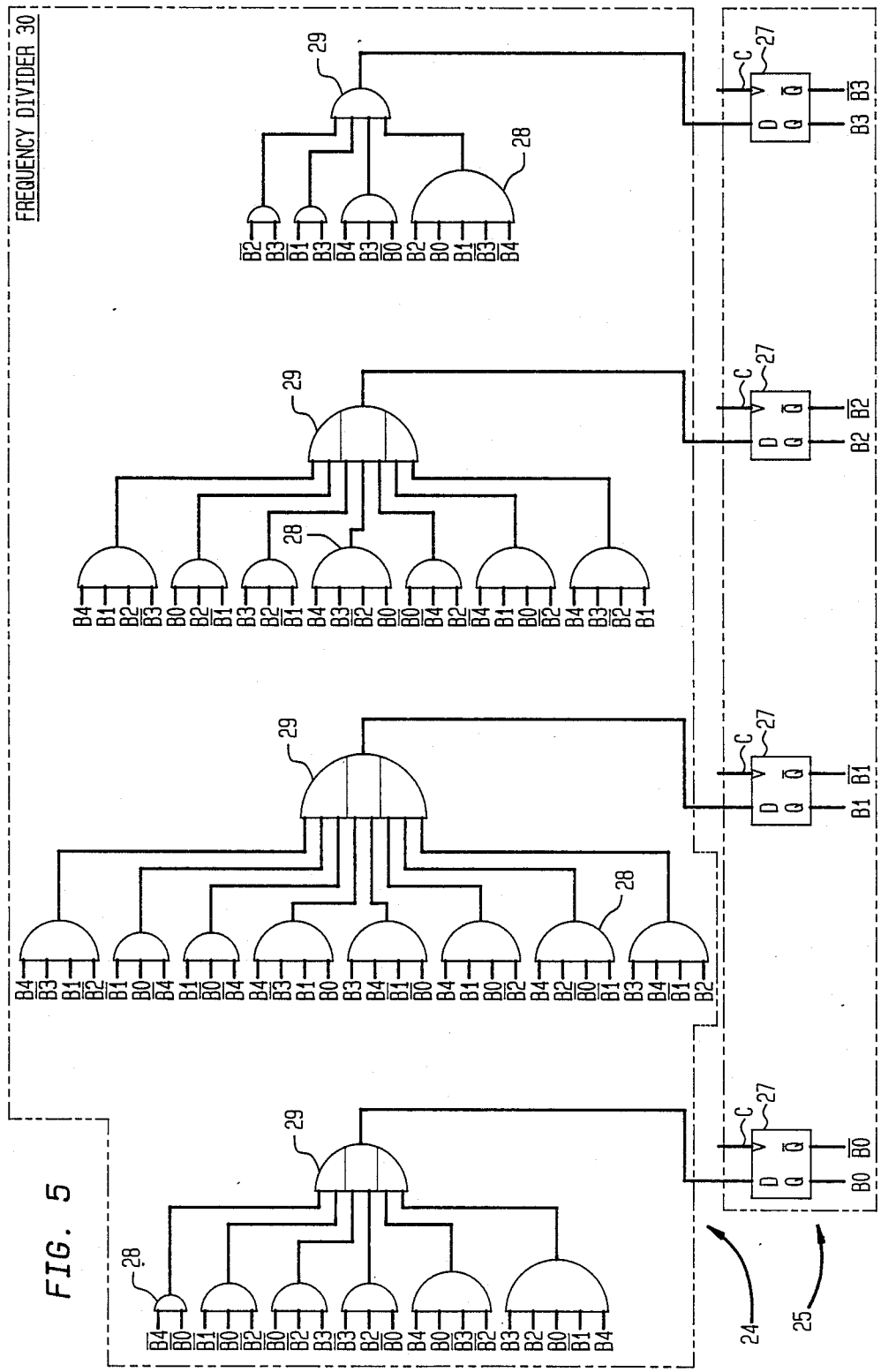
FIG. 5 shows a more detailed diagram of the frequency divider and of the associated correction logic included in the clock signal extractor of FIG. 1.

As shown in FIG. 5, the frequency divider 30 comprises a 4-bit counter with 16 logic states and which normally performs the divide-by-16 operation of the frequency of 32.768 MHz of the sampling signal C. This comprises four bistable multivibrators or flip-flops 27 constituting the register 25 and having at one data input the output signal of the combining logic 24, at the clock input the sampling signal C and at the output a binary signal B0-B3 and an inverted binary signal $\overline{B0}$-$\overline{B3}$. The signal B3, constituting the most significant bit of the overall 4-bit signal available at the output of the register 25, represents the extracted clock signal S (FIG. 25), which is also available externally.

The four noninverted binary outputs B0-B3 of the register 25 and the related inverted outputs $\overline{B0}$-$\overline{B3}$ together with the noninverted output B4 (corresponding to signal T' of FIG. 1) and the inverted output $\overline{B4}$ of the flip-flop 23 are applied to the respective inputs of the correction logic 24, which is comprised of AND gate 28 and OR gate 29, which logic gates are illustrated in FIG. 5.

The configuration of the correction logic 24 is apparent to those skilled in the art once the following mode of operation of the described circuit if known.

Figure 6:
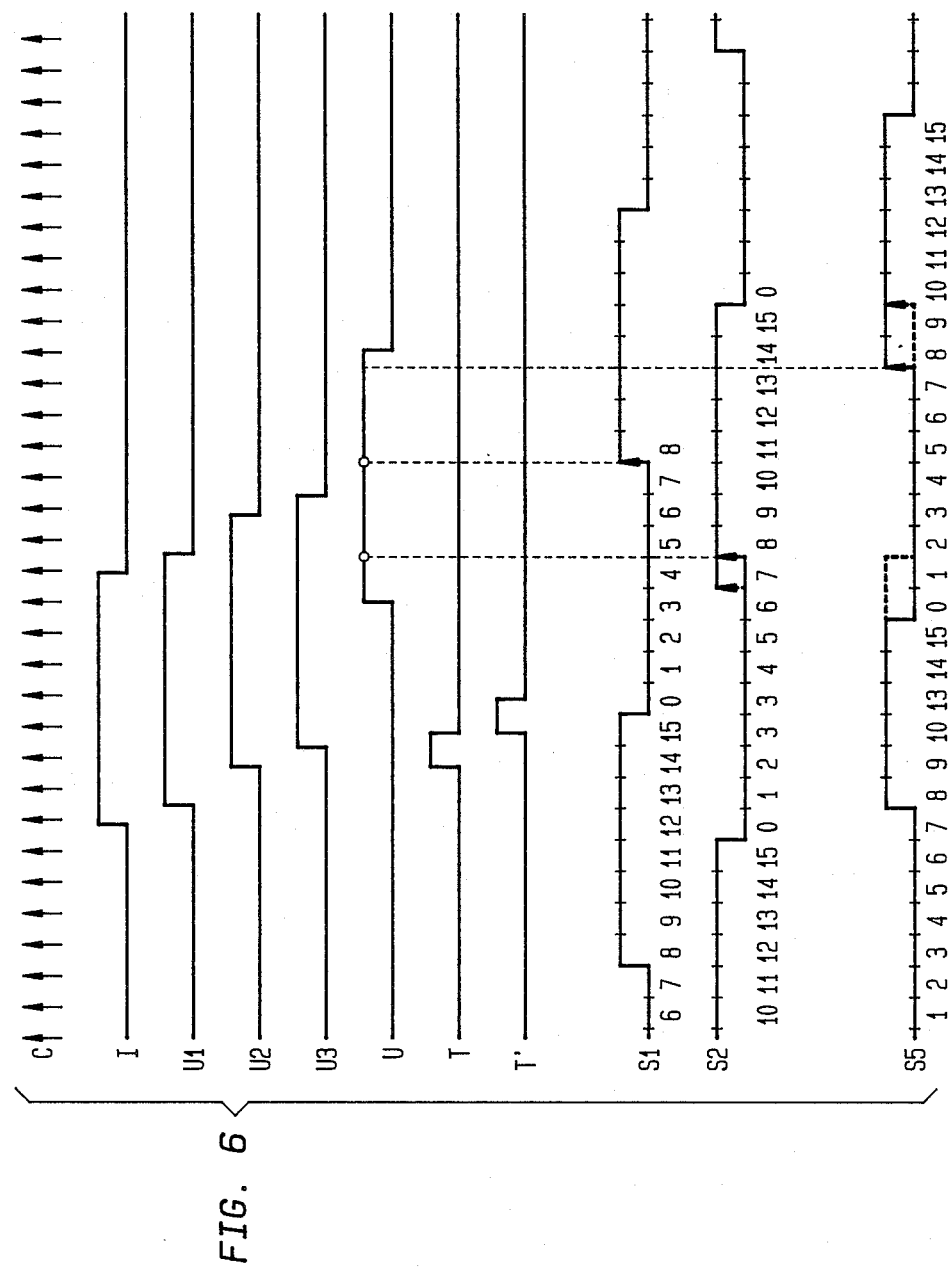
FIG. 6 shows a series of diagrams representing the shape in time of the signals in the clock signal extractor of FIG. 1.

The mode of operation of the circuit of FIG. 1 can be understood with the reference to the diagrams of FIG. 6 and taking into account the tables shown in FIGS. 7 and 8.

The high-frequency sampling signal C periodically samples, with its leading edge (indicated by an arrow in diagram C of FIG. 6) the signal I incoming in the shift register 21. When one of said leading edges coincides with the presence of a logic '1' of one of the signals I', I" in which is divided the received data I, the first output U1 of the register changes to logic level 1, and also at the following leading edge the second output U2 and then the third output U3 and so on change to logic level 1 until they reproduce, with a delay of 7.5 periods, the same signal at the output U. When at the outputs U1, U2 and U3 the combination 110 occurs, which is indicative of a 0-1 transition in the input signal I, the transition detector 22 generates the transition detection signal T which, through the flip-flop 23, is applied as signal T' (signal B4 in FIG. 5) delayed by one step at the input of the correction logic 24 where it combines with the present logic state available at the output of the register 25.

As already described, the 4-bit register 25 gives at its outputs the 16 logic states of a 4-bit counter at the counting frequency determined by the sampling signal C. In the absence of the delayed transition detector signal T' the divider 30 performs a simple divide-by-16. In the presence of a detected transition, the new logic state at the output 25 depends on the coincidence of the pulse of signal T' with one of the 16 logic states of the counter.

The possible states of the outputs of the divider 30 can be grouped in five zones Z1-Z5, in which the central zone Z1 comprises the states 15 and 0, the two adjacent zones Z2 and Z3 comprise the states 1-2-3 and 12-13-14 respectively and the two end zones Z4 and Z5 comprise the states 4-5-6-7 and 8-9-10-11 as shown in FIG. 7.

If the pulse of signal T' coincides with the central zone Z1, as shown by the diagram S1 in FIG. 6, no correction is made so that continuous phase jumps of the clock signal, already phase locked to the input data I are avoided. As can be seen by comparing the diagrams U and S1 in FIG. 6 the leading edge of the extracted clock signal falls within the data pulse to be sampled, making possible sampling through the bistable multivibrators 26', 26"

If the pulse T' coincides with the zone Z2, e.g. with the logic state 3 as shown by the diagram S2 in FIG. 6, indicating that the leading edge of the extracted clock signal (shown in dash dot lines) is too early in relation to the data U at the output of the register 21, a correction delayed by one step is made, i.e. logic state 3 is maintained in the subsequent step so that the leading edge of the clock signal is delayed by one step. In this manner the leading edge (in unbroken lines) is still positioned within the pulse of the data to be sampled.

If the pulse of signal T' coincides with the zone Z5, for example, with the logic state 10 as shown by diagram S5 in FIG. 6, meaning that the leading edge of the extracted clock signal (shown in dot and dash lines) is too delayed relative to the data at the output of the register 21, a correction is made in advance by two steps, i.e. the counter passes directly from logic state 10 to logic state 13 and the leading edge of the clock signal is consequently advanced by two steps (in unbroken lines) to fall again within the pulse of the data to be sampled.

In a similar manner coincidence of the pulse T' with the zones Z3 and Z4 of the counter causes advance of one step and delay of two steps respectively of the leading edge of the extracted clock signal.

As seen, the correction made is essentially a logarithmic function of the phase error detected. The only exception is the central zone of the counter which was modified to have less arbitrariness of phase between the input data and the extracted clock in the absence of jitter and frequency drift.

The overall behavior of the divider 30 on the basis of the commanded correction can be seen in the table of FIG. 8 where S' represents the state of the outputs of the counter at the moment of coincidence with the delayed transition detector pulse T', and S" represents the state of the outputs of said counter immediately following S'.

The important fact is that in each case the extracted clock signal after correction is in phase with the data at the output of the register 21.

While the present invention has been described in connection with a preferred embodiment thereof, it is to be understood that additional modifications, embodiments and applications which will be come obvious to those skilled in the art are included within the spirit and scope of the invention as set forth by the claims appended hereto. For example, the digital clock extractor shown in the drawings is for use with 2 Mbit/s bipolar PCM input signals, however, it is to be understood that it can be modified and used for received signals with frequencies up to about 3 MHz.

What is claimed:

1. A digital clock extractor circuit for bipolar signals, comprising:
   at least one shift register having a bipolar signal input, including means for sampling said bipolar signal input with a sampling signal having a frequency which is a multiple of the frequency of said bipolar signal;
   a transition detector means receiving a combination of parallel outputs of said shift register for generating a transition detection signal when the bipolar signal input reaches a predetermined sequence of logic states at said combination of outputs of said shift register;
   frequency divider means comprising a counter having coupled thereto said multiple-frequency sampling signal, said counter being programmed to derive at its output an extracted clock signal at the same frequency as said bipolar signal input, said frequency divider means further comprising a correction logic circuit which compares said transition detection signal with the logic state of the output of said counter to provide a phase error signal representative of the phase error existing between the extracted clock signal and the bipolar signal input to cause said counter to effect a phase correction of said clock signal, the magnitude of the phase correction being a progressively increasing function of said phase error signal.

2. A digital clock extractor circuit in accordance with claim 1 wherein the relationship between the phase correction and the phase error signal is substantially logarithmic.

3. A digital clock extractor circuit in accordance with claim 1 wherein said combination of outputs consists of the first three of said parallel outputs of said shift register.

4. A digital clock extractor circuit in accordance with claim 1 wherein said counter is comprised of a 4-bit counter with sixteen logic states.

5. A digital clock extractor circuit in accordance with claim 4 wherein said correction logic circuit provides no phase error signal when the transition detection signal is substantially in phase with the extracted clock signal and, provides a phase error signal effecting either one or two steps of said counter, said counter being either advanced or delayed depending upon whether the transition detection signal is advanced or delayed with respect to the extracted clock signal.

6. A digital clock extractor circuit in accordance with claim 5 wherein said phase correction of the clock signal is of either one or two counting steps in advance or delay, depending upon whether said advance or delay of said transition detection signal is either 1 to 3 or 4 to 7 counting steps of the counter respectively.

* * * * *